Sept. 29, 1936.    K. B. STUART    2,055,755
PROCESS OF ACTIVE CARBON PRODUCTION
Filed July 3, 1933
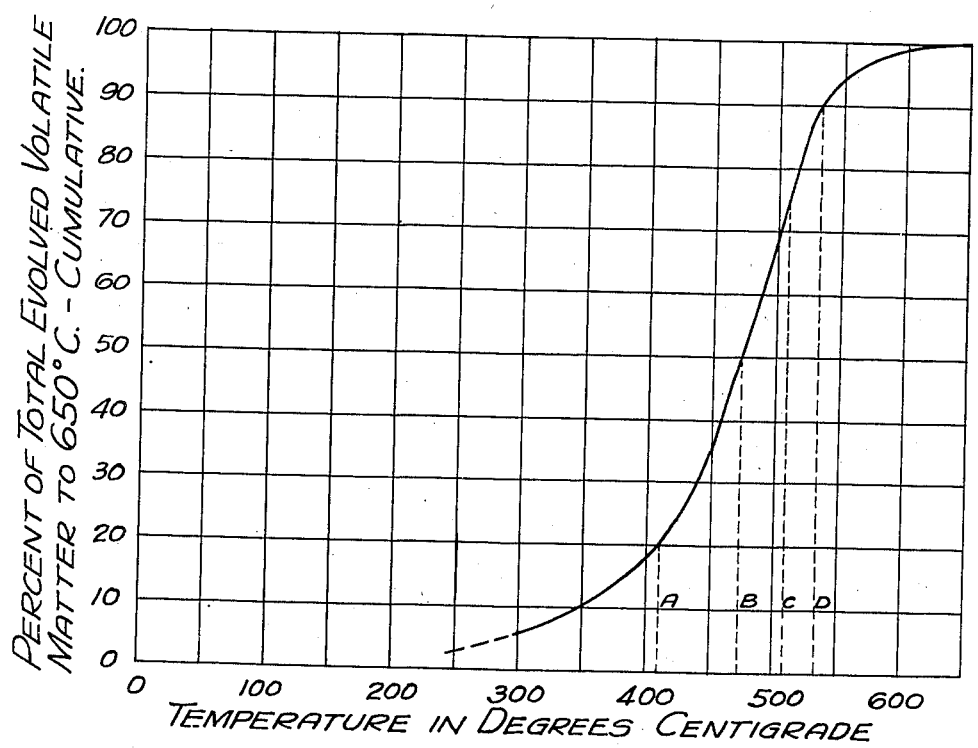
VOLATILE CHARACTERISTIC OF A COLORADO
SUB-BITUMINOUS COAL
Inventor
Kenneth Barton Stuart Patented Sept. 29, 1936

2,055,755

UNITED STATES PATENT OFFICE 2,055,755

PROCESS OF ACTIVE CARBON PRODUCTION

Kenneth Barton Stuart, Pueblo, Colo., assignor to The Colorado Fuel and Iron Corporation, Denver, Colo., a corporation of Colorado Application July 3, 1933, Serial No. 678,873

13 Claims. (Cl. 252—3)

This invention relates to the processes of producing active carbon and has for its object to produce from carbonaceous materials an improved char or carbon of relatively high and rapid absorptive properties and of good physical structure, by a more simple and economical process, permitting the use of denser and heretofore generally unsuitable raw materials such as the cheap universally available low rank coals and lignites; the said process is designed to reduce or regulate the high pressures normally generated within the pore and cell structure of the material during the carbonization stages and thus to overcome or eliminate the harmful effects of such pressures and it comprises heating the material by a practical method wherein the pressures generated within the pore and cell structure of the material are controlled through regulating the rate of evolution of the volatile constituents thereof, by adjusting the heating to conform with the particular characteristics of the material and activating the material at the same time; all as more fully hereinafter set forth and as claimed.

The harmful effects of high pressures within the pore and cell structure of the material during the carbonization stages are, less formation of active carbon, increased formation of secondary and/or inactive carbon, reduced porosity and the necessity of prolonged activation with a consequent decrease in carbon yield.

Active carbon is the so-called primary or alpha carbon of the four forms postulated by Chaney, to-wit: the diamond, the graphitic, the beta or secondary, and the alpha or primary. The active form is so called active because it has been shown to possess unique absorptive properties.

The commercial utility of active carbon is so universally recognized that no statement of its usefulness for absorbing, decolorizing, clarifying and purifying purposes, or of the benefits deriving from an improved and more economical process of production need be made.

Active carbon has been produced commercially from a great many types of carbonaceous material. The general method is first to submit the material to a "preliminary carbonization" at a temperature (650 deg. to 750 deg. C.) high enough to remove most all of the volatile constituents, but at the same time low enough to avoid undue cracking of the evolved gases. The secondary carbon deposited by the cracking of the evolved gases is not active and cannot be activated.

During the decomposition of the raw material the "active carbon", or carbon capable of activation is formed, it is, however, saturated with hydrocarbon gases and must be freed of these absorbed materials by some process commonly termed "activation". The material obtained from the preliminary carbonization is reduced to the desired size and activated, usually by submitting it to steam treatment at temperatures above 900 deg. C.

While a great deal of work has been done relative to activation processes and a considerable number of such developed, the current method of preliminary carbonization has been general throughout for the following reasons: (1) It has been observed that the most suitable materials for active carbon production are those wherein practically all of the volatile constituents are liberated at very low carbonization temperatures. (2) That those materials whose volatile constituents are liberated at fairly high carbonization temperatures, are not suitable for the production of active carbon, yielding active carbon only to a limited degree.

These observations have led to the generally accepted conclusion that there is a "critical temperature" below which active carbon is formed and above which inactive carbon is formed. This theory has been borne out by the facts: (1) That the carbon formed by the harsh cracking of hydrocarbon gases at high temperatures is inactive and cannot be activated. (2) That the carbon or coke produced by high temperature carbonization, as employed by the gas and coke industries, are characteristically inactive.

The consensus of opinion is that this critical temperature is in the neighborhood of 600 to 700 deg. C. and that raw materials if suitable, will, when submitted to preliminary carbonization at 700 deg. C., yield sufficient active carbon to be of commercial value. From the results so obtained raw materials have been classified as either suitable or unsuitable for the production of active carbon. This practice has restricted the field of suitable raw materials to types of carbonaceous materials, having low decomposition temperatures and of which the supply is limited.

The present invention relates to a new process for producing active carbon in large quantities from carbonaceous material by regulating, reducing, or precluding the generation of high pressure within the pore and cell structure of the materials during carbonization. The process relates more particularly to the regulation of said pressures during the carbonization stages while the active carbon is being formed, and thus functions by eliminating the harmful effects of high pressure at their source.

It is my purpose to show that pressure as well as temperature is a vital factor in the manufacture of active carbon; that the pressures generated within the pore and cell structure during carbonization are normally high; that such pressures are harmful; to give practical methods for overcoming such harmful pressures and to show how the regulation of such pressures is beneficial.

From the results of my experiments I observed: (1) That when a Colorado sub-bituminous coal was submitted to preliminary carbonization at 650 deg. C., the yield of active carbon was negligible. (2) That when the preliminary carbonization of said Colorado sub-bituminous coal was conducted so that the rate of volatile evolution was slow and substantially uniform a high yield of active carbon was obtained.

The carbonization variables accompanying the various yields of active carbon obtained in my experiments were, rate of heating and rate of volatile evolution. The rate of heating is an independent variable, indirectly related to the carbonization reactions. The rate of volatile evolution is a dependent variable and is directly related to the carbonization reaction. Further, the rate of volatile evolution is a function of the pressure existing within the pore and cell structure of the material. That is, there is generated within the pore and cell structure sufficient pressure to evolve the liberated "volatiles" (gases and vapors). As the rate of volatile evolution increases the pressure required to drive the volatiles through the existing pores of the material at such rate is increased. It has been shown that as the rate of such flow increases the pressure required to produce such rate is increased approximately as the square of such rate. That is, if the rate of volatile evolution is doubled the pressure is approximately quadrupled. Therefore, by the present methods of carbonization for the production of active carbon wherein the rate of volatile evolution is greatly increased (as shown later in detail) the "carbonization pressures" (the pressures existing within the pore and cell structure of the material) are enormously increased and are consequently very great.

In the carbonization of some materials there is evidence that the carbonization pressure is great enough to rupture or break down the cell walls. In denser materials, such as certain coals, this pressure may be enormous. I have calculated from geometrical considerations of a single independent spherical cell of such material with an apparent gravity of 1.0 that this bursting pressure is in the neighborhood of 30 atmospheres and it is to be expected that localization of such pressure may be very much higher.

With carbonization pressures of this order it will be realized that the usual processes of "vacuum distillation" would not be expedient for the reduction of such pressures. And further, when the volatiles are flowing in a more or less steady stream it can be shown thermodynamically that such flow is dependent only upon the internal higher pressure when the internal higher pressure is 70% or more greater than the outside or back pressure. This is equivalent to saying that when such conditions obtain, the pressure outside the cell can in no way affect the inside pressure.

The decomposition of hydrocarbons is accomplished by "cracking". Cracking is accelerated by heating the material well above its normal vaporization temperature or by heating under pressure whereby the same degree of cracking is obtained at lower temperatures. At higher temperatures or pressures then the cracking reactions are more rapid and harsh or violent and the amount of cracking is increased.

It has been shown that high carbonization pressures are generated during carbonization for the production of active carbon. Such conditions are detrimental to the formation of active carbon as shown by the following probable mechanisms.

When cracking takes place the complex molecule or body is divided into two or more molecules of greater thermal stability. The more violent the cracking action the greater is the transition toward the ultimate stability. Previous work has shown that the inactive form of carbon is of a more definite crystalline structure and more stable than the active form and that the carbon deposited by harsh cracking of gases or vapors is of the crystalline inactive form. The high carbonization pressures generated during carbonization greatly increase the harshness or violence of the cracking reactions and are therefore conducive to the formation of the inactive form of carbon.

High pressures actually raise the volatilization temperatures of the volatile constituents of the material, much in the same manner as they raise the saturation temperatures of liquids. Liberation of the volatiles then, takes place not only under high pressure but also at a temperature materially above the normal vaporization temperatures of the volatiles. Both of these conditions are conducive to harsh and greater cracking and thus to the formation of the inactive form of carbon.

High pressure greatly increases the quantity of liberated volatiles confined within the pore and cell structure of the material. The amount of cracking is thereby increased and under the above described conditions, the formation of inactive carbon is correspondingly increased.

Cracking under high pressure favors the formation of unsaturated hydrocarbons. Unsaturated hydrocarbons form a particularly stable "absorptive complex" with active carbon. Such complexes are difficult to decompose and the final decomposition temperatures thereof may be raised to a point where such decomposition results in the formation of inactive carbon. If decomposition is not effected, removal by activation is necessary and is difficult to accomplish.

The absorptive power of active carbon for all the liberated hydrocarbons is greatly enhanced by high pressure. The quantity of absorbed material is therefore greatly increased. This condition renders the activation process wastefully long and difficult.

The activation of the carbonized material is an expensive step in the production of active carbon, requiring high temperatures (above 900 deg. C.) for the reaction. By present practices of production, due largely to the above mentioned harmful factors, as much as 25–60% weight reduction of carbon is required to effect satisfactory activation.

The harmful effects of these mechanisms are: (1) The potential yield of active carbon is greatly decreased. (2) The quantity of inactive carbon formed is greatly increased. (3) The inactive carbon formed clogs the pores and thereby decreases the porosity of the product and renders the active carbon partially unavailable and difficult or impossible to activate. (4) Prolonged and harsh activation is required. The yield of carbon is thereby materially reduced, the apparent density is decreased and the structure of the carbon is weakened and softened.

The above facts indicate that the critical conditions of active carbon formation and/or activation are dependent upon pressure as well as upon temperature and that the relationship conforms with the conditions set forth in the following tentatively proposed theory. (1) That the critical temperature below which active carbon is formed and above which inactive carbon is formed is a function of the carbonization pressure. (2) That there is for every temperature a corresponding critical pressure and vice versa. (3) That the critical temperature is lower as the pressure increases and that the critical pressure is lower as the temperature increases. (This variable interdependent upon temperature and pressure I call the "critical zone" of active carbon formation.) (4) That the carbon formed below the critical zone is largely active, that formed within the critical zone is a mixture of active and inactive, and that formed above the critical zone is largely inactive.

This theory is substantiated by the facts, that lamp black and carbon black produced at temperatures greatly above the generally accepted critical temperature of active carbon formation, but under conditions of very low pressure, may be rendered highly active; that carbonaceous materials of very low decomposition temperatures (the decomposition taking place under pressure) have proved most suitable for active carbon production, while those of high decomposition temperatures have proved unsuitable. And by the results of my experiments wherein the yield of active carbon, when high carbonization pressures prevailed, was less than 20% of that obtained by proper regulations of the carbonization pressures.

The theory explains the fact that material such as nut shells, woods, etc., the cell structure of which is interconnected and quite open yield highly active carbon by present production methods. With this type of material the pressures are not sufficiently high to bring the decomposition reactions within the critical temperature pressure zone of active carbon formation. And it further explains the relatively low activity of carbons produced from the above mentioned materials by carbonization with mineral additions. The added materials become encrusted within and around the pore and cell structure of the material and impede the evolution of the volatiles thereby causing the generation of harmful pressures and decreasing the active carbon yield.

To overcome the harmful effects of high pressures I proceed as hereinafter described. I determine the thermal distribution of the volatile constituents of a material by a laboratory method employing suitable apparatus for accurately controlling the temperature and for determining the constituents evolved between small intervals of temperatures, such as 25 deg. C. Each temperature is held until the volatile evolution is complete at that temperature. The quantitative thermal distribution of the volatile constituents of a material I call the "volatile characteristic" of the material.

From the data so obtained I construct a curve by plotting cumulative percent of volatiles against the corresponding temperatures of evolution. The resulting curve represents the volatile characteristic of the material and from it I may obtain the percentage of volatiles below any temperature or between any two temperatures and I may anticipate the rate of volatile evolution for any rate of heating and from this calculate the relative carbonization pressures.

Figure 1 gives the volatile characteristic of one Colorado sub bituminous coal used in my experiments and shows that over 70% of the volatile content of this coal below 650 deg., C., dry basis, is concentrated between the temperatures of 410–535 deg. C. That is, approximately 70% of the volatile content thereof is evolved during only about 23% of the temperature rise above 100 deg. C. Generally speaking for a definite carbonaceous material, and as just illustrated, there is a temperature range of fairly narrow limits during which the majority of its volatile constituents are evolved. This temperature range wherein the volatile constituents are concentrated I call the "zone of greatest decomposition" of a material.

Since the volatile characteristic gives the quantitative distribution of the volatile constituents of a material it follows that when a material is heated at a uniform rate there will result a rate of evolution which is normal for the material. That is, with a uniform rate of heating the rate of evolution will vary directly as the quantitative distribution of the volatile content of the material. Due to the zone of greatest decomposition the normal rate of evolution is characterized by a sharp increase. A method of obtaining from the volatile characterisitc of a material the comparative increase in the normal rate of volatile evolution between two temperature zones is illustrated by the following example. Object: To determine the increase between the normal rate of volatile evolution below the zone of greatest decomposition and during the zone of greatest decomposition for the Colorado sub bituminous coal previously mentioned. From Figure 1 approximately 20% of the volatiles are evolved below the zone of greatest decomposition and in approximately 56% of the temperature rise above 100 deg. C. (100–410). Since the normal rate of evolution involves uniform heating it follows that 20% of the volatiles are evolved in 56% of the total time of heating. And similarly from Fig. 1 approximately 70% of the volatiles are evolved during the zone of greatest decomposition (410–535 deg. C.) or in 23% of the total time of heating. Then the proportional average rate of volatile evolution below the zone of greatest decomposition compared to the average rate during the zone of greatest decomposition is as $$\frac{20}{56}$$

is to $$\frac{70}{23}$$

or as .28 is to 3.00 or as 1 is to 10.7. That is, the average normal rate of volatile evolution during the zone of greatest decomposition is approximately 10 times the average normal rate below this zone. And since the pore structure is quite definitely established in the early stages of carbonization the comparative normal pressure relationship between these zones is approximately as 1 squared is to 10 squared or as 1 to 100.

It is obvious that the proportional relationship between the average normal rates of the volatile evolution of the zones cited above or between any other temperature zones will remain constant regardless of the uniform rate of heating applied. This proportional relationship between the average normal rates of volatile evolution of different temperature zones I call the "normal volatile evolution rate increments" of the material.

In the present practice of carbonization for the production of active carbon the typical rate of heating is practically uniform. Consequently the evolution rate increments resulting therefrom conforms with the normal volatile evolution rate increments of the material being carbonized. For instance, by the typical heating curve of present practice the rate of heating is approximately 375 deg. C. per hour (Bureau of Mines Technical Paper 479, 1930). The comparative evolution rate increment between the temperature zones (100–410 deg. C.) and (410–525 deg. C.) is for this rate of heating and for the Colorado sub bituminous coal 1 to 10.7, as in the example given above.

It is apparent that for operative reasons the rate of evolution by present methods may drop somewhat below the normal evolution rate increments of the material but such rate reductions as may occur are small and are therefore not of material benefit in the reduction of the carbonization pressures. Various rates of heating have been used in other methods but in these the reduction has been general, that is the rate of heating has been reduced, for example, from 100 deg. C. to 50 deg. C. per hour and therefore the proportional temperature rise and the normal evolution rate increments have remained substantially unchanged, and the methods have proved of little or no benefit.

It is my purpose to materially reduce the normal volatile evolution rate increments and thereby to enormously reduce the carbonization pressure. To accomplish this purpose I adjust the temperature rise in accord with the thermal distribution of the volatile content of the material, and thereby regulate the rate of volatile evolution to such a degree that the carbonization pressures are maintained within the practical limits of active carbon formation.

I obtain the rate of heating required, to maintain a desired rate of volatile evolution from the volatile characteristic curve of the material in question, by recording the temperatures corresponding to the cumulative volatile percentages of the desired rate. For instance, if the desired average rate of volatile evolution for the Colorado sub bituminous coal mentioned is, on the basis of total volatile matter to 650 deg. C. (dry basis) 20%, 30%, 25%, 15% and 10% per hour I find the required rate of heating by tracing out the temperatures corresponding to 20%, 50%, 75% and 90% of the volatile content, and as illustrated by the lines A, B, C, and D, in Figure 1. The rate of heating required to maintain the above stated rate of volatile evolution is 310, 63, 34, 28, and 115 deg. C. during the successive hourly periods of carbonization.

It is obvious from the above that if a large increase in the rate of volatile evolution is to be prevented for the purpose of controlling the carbonization pressures a radical departure from methods employing uniform rates of heating is necessary. For instance, if a uniform rate of volatile evolution was found to be desirable, and if 70% of the volatiles were concentrated within 23% of the temperature rise, as is the case in Fig. 1, then 70% of the total time of carbonization (above 100 deg. C.) must be used in raising the temperature through the temperature zone comprising 23% of the temperature rise.

In order to adjust the rate of heating so that the rate of volatile evolution is reduced or controlled as above described I have found it necessary to mitigate the effects of autogenous heating. When highly oxygenated materials are heated to temperatures in the neighborhood of 300–350 deg. C. exothermic reactions due to the oxygen content of the material are started. Autogenous heating is prevalent between the temperatures of 300 and 750 deg. C., and the temperature rise of the material between these temperatures is therefore very rapid. Thus even though external heating is greatly reduced, say at a temperature of 400 deg. C., the heating of the material continues to progress rapidly, and the rate of volatile evolution increases accordingly, and control of the carbonization pressures is not accomplished.

To overcome the effects of autogenous heating and so arrest the temperature rise at the desired stage I pass steam into the material during the range of autogenous heating at such points as may be required to absorb and distribute the heat so generated and thus prevent rapid and localized heating from this cause. By reducing or overcoming such autogenous heating I adjust the rate of heating and regulate the rate of volatile evolution, thereby controlling the carbonization pressures as desired.

From the very nature of the theory it is obvious that the particular characteristics of the material in question will largely determine the maximum practical rate of volatile evolution. That is, the reduction required in the normal volatile evolution rate increments will be less for materials of which the upper temperature limit of the zone of greatest decomposition is comparatively low, than for materials of which the upper temperature limit of the zone of greatest decomposition is high, and further, this same relationship will follow for materials the cell structure of which is comparatively open and interconnected on the one hand and close and unconnected on the other hand. Therefore, I do not employ a standard rate of heating for all materials, as is the common practice, but adjust and vary the rates of heating to obtain the particular rates of volatile evolution best suited for the different materials. To accomplish my purpose I may use any rate of volatile evolution reducing the normal volatile evolution rate increments to any degree and during any temperature zone. I may use a number of different rates of volatile evolution and zonal reductions therein to empirically determine the most economical rate of volatile evolution.

In one adaptation of my process applicable to most materials I heat the material rapidly or even harshly in order to obtain a very high rate of evolution, of the occluded gases and of the volatiles of decomposition temperatures low enough to prevent harmful cracking and whereby the pore and cell structure of the material is flushed out and enlarged during the formative period. I continue this rapid heating up to and partially into the zone of greatest decomposition. Thereafter I adapt the rate of heating so that the normal volatile evolution rate increments are materially reduced and the carbonization pressures are therefore greatly reduced during the succeeding periods of carbonization.

In another adaptation of my process I heat the materials as above described and for the purposes stated up to a predetermined temperature which may be below, to, or partially into the zone of greatest decomposition. Thereafter I adapt the rate of heating so that the normal volatile evolution rate increments are reduced to a point where the rate of evolution is substantially uniform during the succeeding periods of carbonization, and the carbonization pressures are not therefore permitted to increase at the higher temperatures.

In a further adaptation of my process I heat the materials as above described and for the purposes stated up to a predetermined temperature which may be below, to, or partially into the zone of greatest decomposition. Thereafter I adapt the rate of heating so that the normal volatile evolution rate increments are so reduced that the rate of volatile evolution is reduced during the higher temperature zones of carbonization and the carbonization pressures recede as the temperature increases.

By the application of my process the carbonization pressures are enormously reduced and the factors conducive to harsh and violent cracking largely overcome, and the subsequent harmful effects thereof are prevented. In short, the process is a practical and economical method of manufacture conforming with the concepts of the proposed critical temperature pressure theory of active carbon formation, and as set forth in the following statements of the benefits thereof.

By the application of my process the yield of active carbon is greatly increased. An enormous reduction in the carbonization pressure being effected the corresponding critical temperature of active carbon formation is very much higher and the amount of decomposition taking place below the critical zone of active carbon formation is correspondingly increased.

By the application of my process the formation of inactive and/or secondary carbon is largely overcome. This logically follows from the above, less decomposition taking place above the critical zone with the formation of inactive carbon. Factors intensifying the harmful cracking of the liberated volatiles are effectively eliminated by the prevention of high carbonization pressures and the formation of secondary carbon thereby is reduced to a minimum.

By the application of my process the porosity of the carbon is increased and a more open inter-connected structure is obtained and the availability of the active carbon is thereby enhanced. The continuity and enlargement of the pore structure is effected by flushing out the pores of the material at temperatures low enough to prevent harmful cracking. A minimum of secondary carbon being formed for the above described reasons, clogging and/or sealing of such pore structure is subsequently prevented. Local high harmful pressures are thereby overcome and the active carbon is rendered more available.

By the application of my process the activation of the carbon is more expeditiously and economically accomplished without the application of processes involving "differential" and "limited" oxidation. By reducing the carbonization pressure the quantity of hydro-carbons absorbed and the number of absorptive complexes formed are materially decreased. Further, the reduction in carbonization pressure effected by the proper regulation of the rate of volatile evolution permits the functioning of physical and chemical laws comprising mass action, partial pressure, dilution, replacement and absorptive phenomena, and whereby the carbon so produced is highly active, or readily activatable, and whereby harsh oxidation and the large reduction in carbon yield (30-60%) and the impaired carbon physical structure resulting from such harsh oxidation methods are effectively overcome.

By the application of the process the objects of the invention, namely, to produce a carbon of improved or relatively high absorptive properties and of good physical structure by a more economical and commercially feasible method, are expeditiously accomplished and its purpose of reducing the carbonization pressures thereby permitting the accomplishment of said objects by the use of the cheap and universally available low rank coals and lignites fulfilled.

In a preferred specific application of my process I crush a suitable grade of sub bituminous coal to a fineness of about 6-14 mesh (meshes per lineal inch) and charge it continuously into the top of a shaft retort. The retort is heated by a suitable means maintaining a temperature of about 300-400 deg. C. at the top and a maximum of about 900-950 deg. C. near the bottom, and is properly vented to allow escape of gases. The material passes continuously downward through the retort and is heated rapidly up to and through part of the zone of greatest decomposition. The heating may be "forced" somewhat during this stage in order to cause a harsh evolution of volatile matter and, as mentioned before, an opening of the pore and cell structure of the material. Now I have previously determined the temperature limits of the zone of greatest decomposition for the material being carbonized. As the temperature then rises or moves into the zone of greatest decomposition (about 400-475 deg. C. for the Colorado sub bituminous coal before mentioned) I inject steam into contact with the material in the retort at the proper place to arrest the rapid rise in temperature and to prevent any sharp rise in temperature due to autogenous heating or exothermic reactions. The amount of steam injected is sufficient to cause the proper adjustment in temperature rise and whereby the normal rate of volatile evolution is reduced and the generation of excessively high cell pressure prevented. As the material passes lower into the retort, the temperature increasing, I may again inject steam in the same manner in order to maintain the proper rate of heating for the material and to prevent harmful autogenous heating at the higher temperatures. The material thus passes through a large part of its downward course with a gentle rate of temperature rise particularly adapted for it. (For the coal previously mentioned this rate is about 75 deg. C. per hour during the first part of the zone of greatest decomposition and diminishes to about 25 deg. C. per hour as a temperature of 650 deg. C. is approached.) Then the temperature is allowed to increase somewhat more rapidly to about 900 deg. C. and steam or other gas is again injected to further activate the carbonized material. The carbon is discharged continuously at the bottom of the retort and cooled with exclusion of air; part of the cooling may be effected by the incoming activating gases. The charging and discharging of the material and injection of steam are all performed in a continuous manner and a "steady state" is thus maintained throughout the retort.

At times, however, I may prefer not to use a continuous process such as described above but may employ a batch type retort instead. In this case the principle of the operation is the same.

I heat the material first rapidly, as described above, and then at the proper time reduce the rate of temperature rise. This latter step is preferably and conveniently accomplished by injecting the proper amount of steam into the material within the retort and continuing the flow of steam as necessary for proper control during the remainder of the process.

I claim:

1. The process of treating carbonaceous material to produce by primary carbonization active carbon, the amounts of volatile constituents evolved by the material during consecutive carbonization temperature-intervals having been previously determined, comprising heating said material at primary carbonizing temperatures and controlling the rate of evolution of the volatile constituents at the temperature intervals where exothermic reaction of volatile components would cause a rapid and localized heating, said control being effected by supplying only at said temperature intervals steam to thereby substantially inhibit said rapid heating and prevent the building up of high carbonization pressures within the pores and cells of the material, said high pressures inducing the formation of inactive carbon.

2. The process of producing active carbon from carbonaceous material, comprising heating said material through a range of primary carbonization temperatures, including that range at which a harsh and copious evolution of volatile matter occurs, to thereby open the pore and cell structure of the material, and then heating at a higher carbonization temperature in the presence of a gaseous medium inducing a lower rate of volatile evolution than would occur if said gaseous medium were not present, while maintaining a uniform rate of volatile evolution, to thereby prevent the generation of high pressure within the pores and cells of the material.

3. The process of producing active carbon from carbonaceous material, comprising heating said material through a range of primary carbonization temperatures, including that range at which a harsh and copious evolution of volatile matter occurs to thereby open the pore and cell structure of the material, and then heating at the primary carbonization temperature-range herein designated "zone of greatest decomposition" in the presence of a gaseous medium inducing a lower rate of volatile evolution than would occur if said gaseous medium were not present to thereby prevent the generation of high pressure within the pores and cells of the material, said medium being supplied only within said zone of greatest decomposition.

4. The process of producing active carbon from carbonaceous material, comprising heating said material through a range of primary carbonization temperatures, including that range at which a harsh and copious evolution of volatile matter occurs to thereby open the pore and cell structure of the material, and then heating at the primary carbonization temperature-range herein designated "zone of greatest decomposition" in the presence of a gaseous temperature-reducing medium functioning to reduce the rate increments of volatile evolution to less than the normal volatile evolution rate increments of the material to thereby prevent the generation of high pressure within the pores and cells of the material, said medium being supplied only within said zone of greatest decomposition.

5. The process of treating carbonaceous material to produce by primary carbonization active carbon, the amounts of volatile constituents evolved by the material during consecutive carbonization temperature-intervals having been previously determined, comprising heating said material to carbonize the same and supplying to said material at the primary carbonization temperature range herein designated "zone of greatest decomposition" a gaseous medium inducing a lower rate of volatile evolution than would occur if said gaseous medium were not present to thereby prevent the generation of high pressure within the pores and cells of the material, said medium being supplied only within said zone of greatest decomposition.

6. The process of treating carbonaceous material to produce by primary carbonization active carbon, the amounts of volatile constituents evolved by the material during consecutive carbonization temperature-intervals having been previously determined, comprising heating said material to primary carbonize the same and supplying steam to said material only at the primary carbonization temperature range herein designated "zone of greatest decomposition" the steam inducing a lower rate of volatile evolution than would occur if said steam were not present to thereby prevent the generation of high pressure within the pores and cells of the material.

7. The process of treating carbonaceous material to produce by primary carbonization active carbon, the amounts of volatile constituents evolved by the material during consecutive carbonization temperature-intervals having been previously determined, comprising heating said material at primary carbonizing temperatures and controlling the rate of evolution of the volatile constituents at the temperature intervals where the exothermic reaction of volatile components would cause a rapid and localized heating, said control being effected by supplying only at said temperature intervals a gaseous medium to thereby substantially inhibit said rapid heating and prevent the building up of high carbonization pressures within the pores and cells of the material, said high pressure inducing the formation of inactive carbon.

8. The process of producing active carbon from carbonaceous material, comprising heating said material through a range of primary carbonization temperatures, including that range at which a harsh and copious evolution of volatile material occurs, to thereby open the pore and cell structure of the material, and then heating at a higher primary carbonization temperature in the presence of steam inducing a lower rate of volatile evolution than would occur if said steam were not present, while maintaining a uniform rate of volatile evolution, to thereby prevent the generation of high pressure within the pores and cells of the material.

9. In a process for producing active carbon by coking carbonaceous material containing volatile matter of such character that a relatively small proportion of it is removable by heating in a lower temperature range and a relatively large proportion of it is removable by heating in an upper temperature range which is no wider than the lower temperature range, the improvement which comprises rapidly raising the temperature of the material during coking in the lower temperature range, slowly raising the temperature of the material during coking in the upper temperature range, and inhibiting a rapid rise in temperature of the material during coking in the upper temperature range by removing exothermic heat of reaction from the material while it is being coked in the upper temperature range, thereby preventing development of excessive pressure within the particles of the carbonaceous material due to volatilized matter entrapped therein.

10. In a process for producing active carbon by coking carbonaceous material containing volatile matter of such character that a small proportion of it is removable by heating in a wide lower temperature range and a larger proportion of it is removable by heating in a narrower and more elevated temperature range, the improvement which comprises heating a sample of the material and determining the proportions of the volatile matter which are removable by heating in the wide lower temperature range and the narrower upper temperature range, thereby determining the relative rates at which the temperature should be raised in both of said ranges in order to promote the same rate of removal of volatile matter in both ranges, rapidly raising the temperature of the material at a predetermined rate during coking through the lower temperature range, slowly raising the temperature of the material at a predetermined rate during coking through the upper temperature range, said predetermined rate of raising the temperature in the upper range being such that the rate of removal of volatile matter in the upper range does not exceed that in the lower range, and inhibiting a rapid rise in temperature of the material during coking through the upper range by removing exothermic heat of reaction from the material while it is being coked in the upper temperature range, thereby preventing the development of excessive pressure within the particles of the carbonaceous material due to volatilized material entrapped therein.

11. In a process for producing active carbon by coking coal containing volatile matter of such character that a relatively small proportion of it is removable by heating from atmospheric temperature to about 400° C. and a relatively large proportion of it is removable by heating in a temperature range from about 400° C. to about 500° C., the improvement which comprises rapidly raising the temperature of the coal during coking to about 400° C., and thereafter slowly raising the temperature of the coal during coking from about 400° C. to about 500° C., the rate at which the temperature is raised from 400° C. to 500° C. being such that no greater amount of volatile matter is evolved from the coal in unit time above 400° C. than is evolved in unit time below 400° C., and inhibiting a rapid rise in the temperature during coking of the coal from 400° to 500° C. by removing exothermic heat of reaction from the coal while its temperature is rising from 400° to 500° C.

12. Process in accordance with claim 11 in which exothermic heat of reaction is absorbed by a gaseous medium introduced to prevent a rapid rise in temperature of the coal from 400° to 500° C.

13. In a process for producing activated carbon by coking coal containing volatile matter of such character that a small proportion of it is removable in a wide first temperature range and a relatively larger proportion is removable in a relatively narrow but more elevated second temperature range, the improvement which comprises raising the temperature of the particles of coal during coking at a rapid rate in the first temperature range, raising the temperature of the particles of coal during coking in the second range at a slower rate, and inhibiting a rapid rise of temperature of the coal during coking in the second range due to the evolution of exothermic heat of reaction by introducing a cooling medium to absorb said exothermic heat.

KENNETH BARTON STUART.